United States Patent [19]

Feddick

[11] Patent Number: 4,880,328
[45] Date of Patent: Nov. 14, 1989

[54] DRIVE ENGAGEMENT APPARATUS

[76] Inventor: Michael R. Feddick, W. 5655 Pine Ave., Medford, Wis. 54451

[21] Appl. No.: 271,276

[22] Filed: Nov. 15, 1988

[51] Int. Cl.⁴ .............................................. B60B 27/00
[52] U.S. Cl. ........................................ 403/1; 403/349; 180/233
[58] Field of Search ........................... 403/1, 348, 349; 180/233

[56] References Cited

U.S. PATENT DOCUMENTS

| | | | |
|---|---|---|---|
| 3,251,630 | 5/1966 | Astley | 403/1 X |
| 4,453,852 | 6/1984 | Gilcrest | 403/1 |
| 4,512,613 | 4/1985 | Nassiri | 403/1 X |

*Primary Examiner*—Andrew V. Kundrat
*Attorney, Agent, or Firm*—Berman, Aisenberg & Platt

[57] ABSTRACT

An improved mechanism is provided for selectively altering the position of a depressible, outwardly biased, shiftable structure, such as a splined shaft, and for releasably holding such structure in either a depressed or an outwardly shifted position. The mechanism is especially adapted for use with powered wheel hub assemblies, such as commonly employed in combine or normally self-propelled agricultural implements or the like, in which provision is to be made for disengaging the hub from an associated power shaft to permit two-wheel drive or towing of the implement at higher speeds than those used for operation of the implement. The power shaft is disengaged when the plunger of the device is pushed inward and turned through 90° to lock it in position. On releasing the handle by turning through 90°, the spring loaded plunger is retracted and the powered wheel hub assembly is engaged in a drive position.

8 Claims, 1 Drawing Sheet

DRIVE ENGAGEMENT APPARATUS

FIELD OF THE INVENTION

The invention relates to a mechanism for easily engaging or disengaging a drive hub.

BACKGROUND OF THE INVENTION

A known farm implement employs a drive axle and wheel supporting hub connected by a mechanism which allows the axle to be engaged with or disengaged from the hub. This permits one to engage the hub while the implement is being used and to disengage it when the implement is being towed between fields. This substantially reduces the wear on the axle and increases its useful life. The disengagement is effected by depression of the axle shaft. Known mechanisms for selectively changing the position of the shaft to either a depressed position for disengaging the drive hub or an outward position for engaging the drive hub are cumbersome to use.

One conventional construction is a reversible disengaging plate having a projection. The plate is bolted to the hub assembly such that the projection pushes the shaft inward in one position, and allows the shaft to move outward when the plate is bolted to the hub in the reversed position. The plate must be removed, reversed and reinstalled each time the drive hub is engaged or disengaged.

The general operation of another such hub system is described in Gilcrest, U.S. Pat. No. 4,453,852, the disclosure of which is incorporated herein by reference. Gilcrest describes a hub engaging and disengaging device in which a plunger is held in the inward position by two balls. The plunger is moved from the inward, disengaged drive position to the outward, engaged drive position, by pushing the balls into radially located grooves by depressing a pair of shiftable control members having these grooves located in a lower portion thereof. To disengage the drive, the plunger is depressed, allowing the balls to locate against a shoulder of the plunger and allowing the control members to move axially outward.

Other patents showing different arrangements for engaging and disengaging a hub include Hegar, U.S. Pat. Nos. 3,442,361; Kapusta, 184,258; Erickson, 4,555,197; Kleespies, 4,089,610, and Williams, 3,753,479.

SUMMARY OF THE INVENTION

The invention is a device for attachment to a powered wheel hub assembly of a vehicle, preferably an agricultural implement such as a combine harvester. The device is easily installed and engages or disengages the drive hub by axially shifting a power shaft of the vehicle. The shaft is normally biased axially outward, engaging the hub, and the hub includes an aperture aligned with the axis of the power shaft for allowing the shaft to be contacted by a mechanism for depressing the shaft to disengage the hub.

The device includes a body having a bore therethrough and means for mounting the body on the hub assembly with the bore aligned with the power shaft of the vehicle. A plunger is reciprocally mounted in the bore with its inner end operably coupled to the outer end of the axially shiftable power shaft. Movement of the plunger causes the power shaft to move, thus engaging o disengaging the hub from the shaft.

A locking bar extends transversely from the plunger for being restrained by supports extending into the body of the device when the plunger is depressed, holding the power shaft out of engagement with the hub, in a first position. The plunger may be rotated such that the locking bar is not restrained by the supports to allow the plunger to move outward to couple the power shaft to the hub, in a second position.

It is an object of the invention to provide an easily used and installed device for engaging and disengaging a hub assembly.

DETAILED DESCRIPTION OF THE INVENTION

An improved mechanism is provided for selectively altering the position of a depressible, outwardly biased, shiftable structure, such as a splined shaft, and for releasably holding such structure in either an inwardly depressed or an outwardly shifted position. The mechanism is especially adapted for use with powered wheel hub assemblies, such as that commonly employed in combines or other self-propelled agricultural implements in which provision is made for disengaging the hub from a power shaft to permit towing or two-wheel drive of the implement at higher speeds than those used for operation of the implement.

One need only release the plunger handle of the device to allow the shaft to move outward to engage the power shaft with the hub, allowing four-wheel drive operation. Disengagement of the hub is easily accomplished by pushing the plunger handle inward to disengage the power shaft from the hub, and by turning the handle through 90° so that the locking bar is restrained by the supports to retain the plunger in the depressed position, thus enabling the equipment to be towed or driven, at higher speed, in freewheel position or two-wheel drive.

Figure 1:
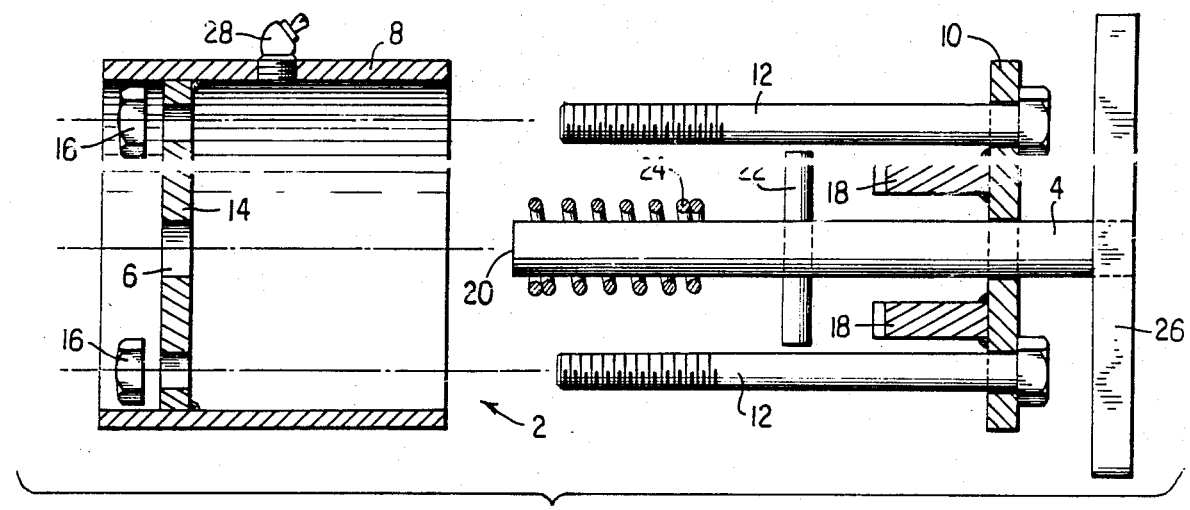
FIG. 1 is an exploded diagram, partly in cross-section, of a preferred embodiment of the invention.

FIGS. 1 to 4 illustrate a preferred embodiment of the invention. FIG. 1 is an exploded diagram of apparatus 2. Plunger 4 fits through an axial bore 6 in divider 14 which is secured (e.g. by welding) to cylindrical body 8. End plate 10 and body 8 are held in position on the hub assembly (not shown) by bolts 12 which are secured to end plate 10 and divider 14 by nuts 16. A pair of spaced shoulders or supports 18 extend into body 8 when device 2 is assembled. Supports 18 may be a pair of elongated parallel members extending from end plate 10 into body 8. Plunger 4 extends through bore 6 and an aligned bore of the hub assembly of the combine or other vehicle, whereby inner end 20 of plunger 4 is operably coupled with the outer end of an axially shiftable power shaft in the hub assembly.

Locking bar 22 extends from plunger 4, preferably perpendicularly, and spring 24 surrounds the inner portion of plunger 4. Grease valve 28 is conveniently located in body 8.

Figure 2:
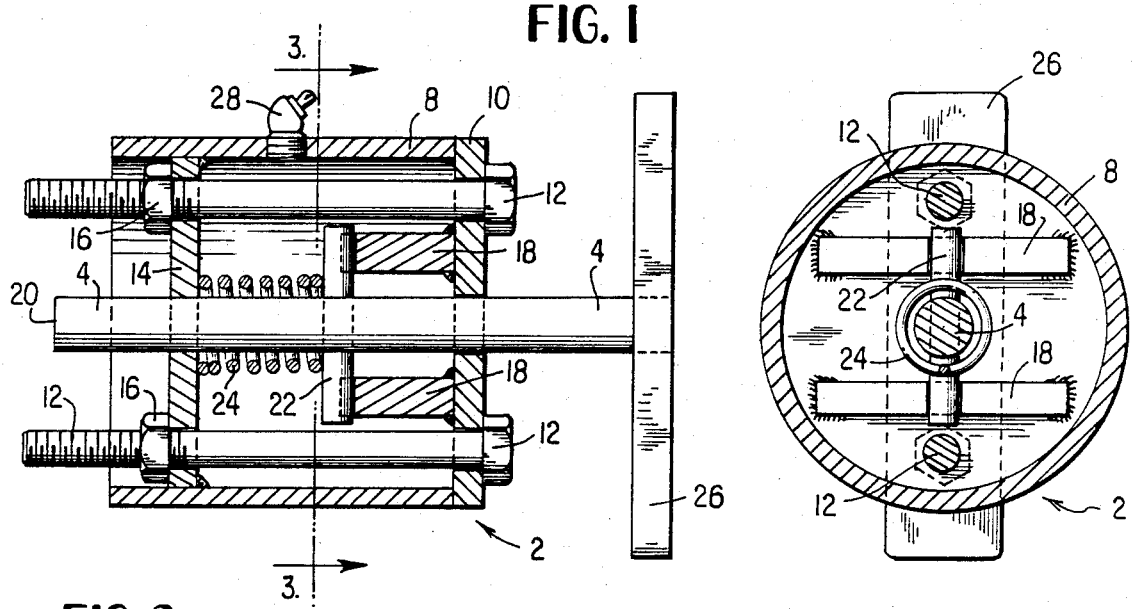
FIG. 2 is a side view of the device of FIG. 1, partly in cross-section, showing the device in a disengaged drive position.
Figure 3:
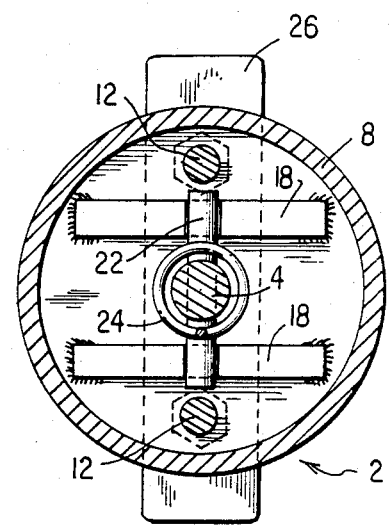
FIG. 3 is a cross-section taken on line 3—3 of FIG. 2.

To disengage the hub, handle 26 (attached to plunger 4 for ease of operation) is pushed inwardly so that end 20 depresses the axially shiftable power shaft of the hub assembly. Spring 24 is thus compressed between divider 14 and locking bar 22, as shown in FIG. 2. Handle 26 is rotated through 90° and released so that locking bar 22 rests against the underside of spaced supports 18. FIGS. 2 and 3 show locking bar 22 restrained by supports 18, the power shaft being disengaged.

Figure 4:
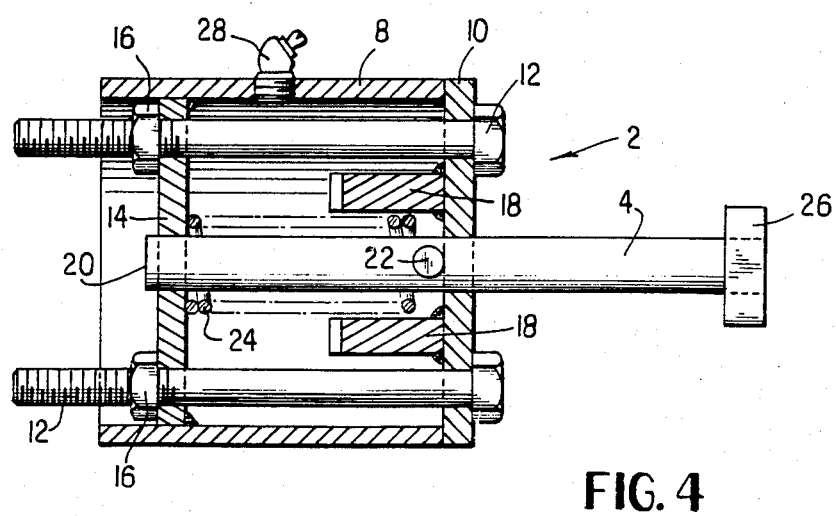
FIG. 4 is a side view, partly in cross-section, showing the device in an engaged drive position.

To engage the hub, handle 26 is turned through 90° to the position shown in FIG. 4. This turns locking bar 22, which is shown substantially perpendicular to supports 18, in FIGS. 2 and 3, to a position parallel with supports 18. With handle 26 and locking bar 22 positioned parallel to supports 18, spring 24 pushes locking bar 22 between supports 18, thus releasing plunger 4 and allowing the power shaft to engage the hub assembly.

To engage the hub, the driver need only turn handle 26 through 90°, allowing the spring loaded plunger to be released. To disenage the hub, the handle is pushed in and turned 90° to restrain the locking bar against the supports.

Plunger 4 is the only moving part, and the device has the advantage of very simple operation. The device is simply installed by attaching device 2 to the hub assembly using bolts 12. The device may be left in place indefinitely.

Other machines on which the device may be used include self-propelled choppers, sprayers, cotton-pickers, etc. The device may be attached to new machines or machines already in use. Using a device of the invention, the chance of hydrostatic failure is greatly reduced, since the hub may be taken out of gear more often, such as for travel between fields or for higher speed operation. This reduces the risk of overheating the hydrostatic drive oil. When the hubs are left in gear and the electric solenoid switch in the cab is turned off or put in two-wheel drive, the oil between the motors which drives the hubs and the electric valve controlled by the cab switch overheats. The oil quality is thus destroyed, creating problems in the hydrostatic drive system which pumps the oil for the drive motors. Repair of a hydrostatic drive system is very costly.

It will apparent to one skilled in the art that locking bar 22 and supports 18 may be differently configured while still maintaining the function in which a bar is locked against supports when the hub is disengaged. Similarly, other configurations will allow the locking bar to be released when the hub assembly is engaged, i.e., with the power shaft and plunger in an outward position.

While the invention has been described above with respect to certain embodiments thereof, it will be appreciated that various changes and modifications may be made without departing from the spirit and scope of the invention.

What is claimed is:

1. Apparatus for attachment to a powered hub assembly of a vehicle for selectively engaging or disengaging a rotatable and axially shiftable power shaft of said vehicle, comprising:
    a body provided with a bore therethrough and means for mounting said body on the hub assembly;
    a plunger reciprocally mounted in said bore for operable coupling to an outer end of said axially shiftable power shaft for axially moving said power shaft;
    spring means for outwardly biasing said plunger; and
    locking bar means within said body extending transversely from said plunger for engaging shoulder means for restraining said plunger when said plunger and said power shaft are in a first position and for disengaging said shoulder means when said plunger and power shaft are in a second position.

2. Apparatus of claim 1 wherein said locking bar means comprises an elongated bar extending perpendicularly from a longitudinal axis of said plunger.

3. Apparatus of claim 1 wherein the body is cylindrical.

4. Apparatus of claim 1 further comprising a handle attached to said plunger for being turned through 90° to engage or disengage the power of the vehicle.

5. Apparatus for attachment to a powered hub assembly of a vehicle for selectively engaging or disengaging a rotatable and axially shiftable power shaft of said vehicle, comprising:
    a body provided with a bore therethrough and means for mounting said body on the hub assembly;
    a plunger reciprocally mounted in said bore for operable coupling to an outer end of said axially shiftable power shaft for axially moving said power shaft;
    spring means for outwardly biasing said plunger; and
    locking bar means extending transversely from said plunger comprising an elongated bar extending perpendicularly from a longitudinal axis of said plunger for engaging shoulder means for restraining said plunger when said plunger and said power shaft are in a first position and for disengaging said shoulder means when said plunger and power shaft are in a second position;
    wherein said shoulder means comprises a pair of spaced supports extending into said body.

6. Apparatus of claim 5 wherein the pair of spaced supports comprises a pair of elongated parallel members.

7. Apparatus of claim 6 wherein said locking bar is perpendicular to the members in said first position and parallel to the members in said second position.

8. A device adapted to be attached to a rotatable powered wheel hub assembly of a ground-contacting wheel of a normally self-propelled vehicle wherein the device is adapted to be selectively used in drive position or free wheeling position by respectively being uncoupled from or coupled with a rotatable and axially shiftable power shaft of said vehicle, said shaft being yieldably biased in an axially outward direction, said hub assembly including an aperture aligned with the axis of said shaft and disposed outwardly from the end of said shaft, said device comprising:
    a cylindrical body provided with a bore therethrough and means for mounting said body on the hub assembly;
    an outwardly biased spring-loaded plunger reciprocally mounted in said bore having, for said drive position, its inner end operably uncoupled from the outer end of said axially shiftable power shaft for engagement of the power shaft with the hub assembly and, in free wheeling position, its inner end operably coupled with the power shaft for disengagement of the power shaft from the hub assembly; and
    elongated bar means within said body extending perpendicularly from the axis of said plunger for being restrained by a pair of spaced elongated parallel bar supports extending into said body when said plunger is pushed inwardly and said hub assembly is disengaged from said power shaft in free wheeling position, said elongated bar means being turned through 90° and withdrawn from said restraining means when said plunger is uncoupled from said power shaft enabling said power shaft to shift axially outward to a drive position engaged with the hub assembly.

* * * * *